Figure 1:
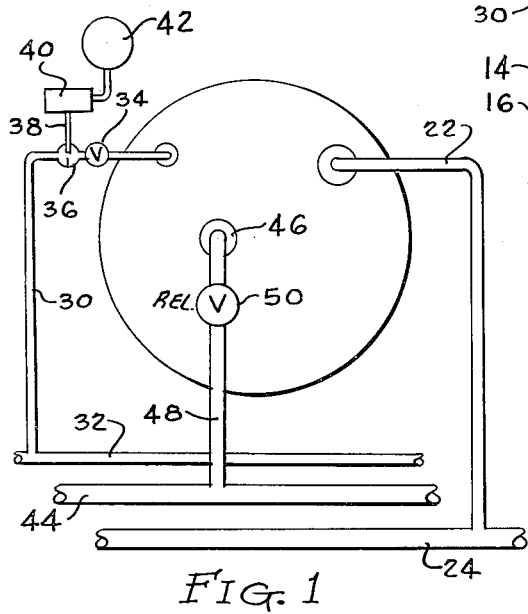

June 6, 1961

J. J. HENRY 2,986,892

MEANS AND METHOD FOR PROTECTION OF
LIQUEFIED GAS STORAGE TANK

Filed June 24, 1958

INVENTOR.
James J. Henry

BY
Dows, McDougal, Williams & Hersh

Attorneys

United States Patent Office 2,986,892
Patented June 6, 1961

2,986,892
MEANS AND METHOD FOR PROTECTION OF LIQUEFIED GAS STORAGE TANK
James J. Henry, New York, N.Y., assignor, by mesne assignments, to Conch International Methane Limited, Nassau, Bahamas, a corporation of the Bahamas
Filed June 24, 1958, Ser. No. 744,239
2 Claims. (Cl. 62—49)

This invention relates to the storage and transportation of a low boiling liquefied gas and it relates more particularly to the facilities in storage for safely housing the liquefied gas in containers of large capacity.

For the most part, it is impractical and uneconomical to construct large containers with walls strong enough to withstand the high loads existing when attempting to house a liquefied gas at high pressure. Thus, when it is desired to make use of a container of large capacity for the storage of a cold boiling liquefied gas, it becomes practical to construct the container for storage of the liquefied gas at about atmospheric pressure or, preferably, a few points above atmospheric pressure. The inventive concepts will be illustrated with liquefied natural gas as representative of the many liquefied gases such as air, oxygen, nitrogen and the like.

At atmospheric pressure, liquefied methane, which is the principal component of natural gas, boils at about —258° F. Usually liquefied natural gas will contain small amounts of heavier hydrocarbons which will raise the boiling point slightly, depending upon the amount and types of hydrocarbons, but it will generally lie somewhere below —240° F. Liquid oxygen, nitrogen, helium and air or the like gases will boil at still lower temperatures at atmospheric pressure. Thus, the problem is to construct a storage tank of large capacity which is sufficiently well insulated to minimize heat loss from the ambient atmosphere to the liquid content material. When suitably insulated, the small amount of heat naturally entering the liquid to cause vaporization or boiling presents no problem with respect to the ability to handle the vapor either by disposing of the vapor or, preferably, by using the vapor as a source of cold and then heat or power, when formed of natural gas. Instead, the vapors can be reliquefied for return to the container in storage or transportation. The more difficult problem arises in the failure of insulation whereby the heat leak becomes excessive. This not only leads to large and uncontrolled losses of product but results further in the generation of vapors in such amounts as to present difficulties in handling.

In ship transportation of the liquefied gas, as represented by the transportation of natural gas in a liquefied state from a source of plentiful supply to an area where a deficiency exists, further problems arise in that the steel of which the ship's hull is usually constructed will tend to lose its ductility if exposed to the low temperatures of the liquefied gas. The insulation is usually employed in a manner to protect the ship's hull from the cold of the liquefied gas, and failure of insulation presents the problem of the rapid transmission of the low temperatures of the liquefied content material to the hull and the difficulty arising as a consequence thereof.

The tanks being considered have a capacity of many thousands of barrels. When constructed in a ship for transportation, the tanks and the insulation represent a substantial part of the investment in the ship. They are, as a result, considered to be an integral part of the ship and intended for an indefinite life in use with the ship. Thus, it is desirable to uncover weaknesses which develop in the tank and insulation in use so that repairs can be made in advance to avoid tying up the ship for an undesirable period of time and without causing substantial reconstruction which might otherwise be required if deficiencies suddenly develop in the construction of the tank or in its insulation.

Thus, it is an object of this invention to provide a construction for the safe and efficient storage and transportation of a cold boiling liquefied gas, and it is a related object to provide an assembly embodying a heavily insulated container of large capacity for the storage and transportation of cold boiling liquefied gas at about atmospheric pressure and which embodies means for ascertaining the breakdown of the insulation sufficiently in advance of its deterioration to enable replacement or repair before any of the difficult situations or conditions described actually arise, thereby safely to maintain the liquefied gas with minimum loss by vaporization.

These and other objects and advantages of this invention will hereinafter appear and for purposes of illustration, but not of limitation, an embodiment of the invention is shown in the accompanying drawing in which—

Figure 2:
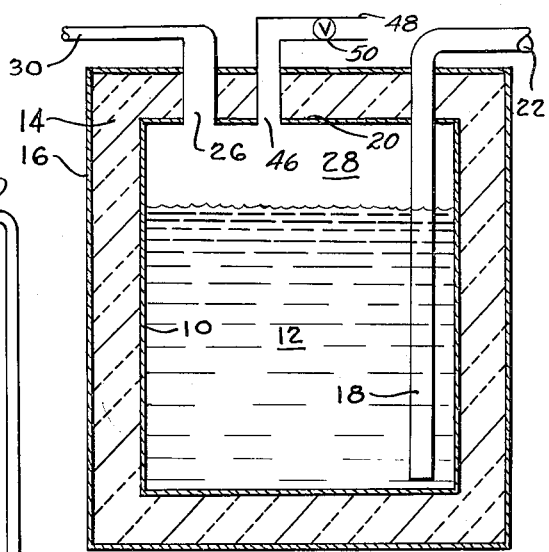

FIG. 1 is a top plan view of a storage tank embodying the features of this invention; and FIG. 2 is a sectional elevational view through the insulated storage tank showing the arrangement of elements embodied in the practice of this invention.

As a natural occurrence, heat will leak from the atmosphere through the tank to the cold liquid in the tank. Such heat leak will result in boiling of the liquid and the consequent conversion of a small amount of the liquid to the vaporized state. Under ordinary circumstances, considering the size of the tank, the amount of liquid content material, and the efficiency of the insulation, the amount of vaporization of the liquid because of such natural heat leaks will represent only a small fraction of a percent per day of the liquefied gas in storage. The rate of vaporization will vary only slightly from the high and low temperatures of the ambient atmosphere and from the amount of liquid in the tank.

When, however, failure of the insulation begins to take place, or other unforseen circumstances develop which permit heat leaks to increase in rate, a noticeable change takes place in the amount of vaporization of the liquid gas in the tank. While this change in the rate of vaporization may not be noticeable from hour to hour, or even from day to day, the increase in the amount of heat leak will make itself known by comparison of the rate of vaporization over long periods of time. Such gradual increase in the rate of vaporization is indicative of difficulties arising in the insulation and such warning is given in sufficient time to enable steps to be taken at the proper place for alleviating the difficulty, or for build-up or reinforcing the insulation before any emergency develops. If the rate of increase in vaporization is more rapid, a different situation is indicated which may require immediate attention as distinguished from waiting for replacement or repair until a better time or better facilities are available.

While the means of control will not indicate the exact zone of deterioration, it is effective to warn of a developing situation which can be localized by other means. For example, thermocouples can be employed in various parts of the assembly to detect cold spots or, in the alternative, visual examination can be made of the interior of the container for signs of excessive boiling or agitation.

It is important in the construction and operation of the tanker or liquid gas carrier to take every precaution for acquiring as complete knowledge as possible of the characteristics and condition of the tanks and the insulation since both of these elements represent an integral part of the ship and either failure of the insulation or tank can lead to the failure of the ship.

The means for carrying out the invention is illustrated in the accompanying drawing showing only one of the many tanks in a ship's construction and in which description will be made only to those parts of the ship and tank and the insulation as is necessary for describing the concepts of this invention. Many of the other elements employed in combination with the ship and tank relate to other operations forming no part of the present invention. It will be understood that while the concepts are described with reference to an insulated tank for ship transportation of the liquefied gas, the concepts are equally applicable to any land storage of the liquefied gas in stationary storage tanks mounted on suitable supports.

Referring now to the drawing, 10 indicates an inner metal shell of large capacity for use in housing large volumes of a cold boiling liquefied gas 12. Because of the extremely low temperature of the liquid directly in contact with the inner walls of the shell, it is desirable to construct the shell of material which is fluid and vapor impervious and which does not lose its strength of ductility at the temperature conditions existing. For this purpose, use can be made of such structurally strong metals as aluminum, alloys of aluminum, copper, austenitic steels such as 18–8 stainless steel. For this purpose, use cannot be made of mild steels or other non-austenitic steels which are incapable of maintaining the desired strength characteristics at temperatures below −100° F.

The shell is lined on its outer wall with a thick layer 14 of a thermal insulating material. This may take the form of a packed insulation of glass wool fibers, mineral wool fibers and the like. It may constitute a structurally strong insulation which is built up on the walls of the shell, such for example, as of panels of balsa wood, foamed glass and the like. If the tank constitutes an inner shell confined in spaced relation with the walls of an outer shell 16, the space between the walls can be evacuated or else filled with a material of low heat conductivity, such as granules of cork, exfoliated vermiculite, "Santo-Cel" and the like, preferably with means to subdivide the space into separate compartments to minimize packing of the insulation. When spaced walls are employed, the outer shell can be fabricated of metals such as mild steel, since the outer shell will be protected from the cold by the insulation layer.

The tank is fitted with a downpipe 18 which, preferably, extends through the top wall 20 to a level adjacent the bottom for introduction and removal of the liquid cargo 12. The downpipe 18 is connected by a trunkline 22 to a main header 24 adapted to be connected to a shore facility for filling the tank at the liquefaction site or for removal of the liquefied gas at the station of use. The tank is also provided with an outlet 26 at the top of the shell above the liquid level and in communication with the vapor area 28 above the liquid level. The vapor outlet 26 is connected by a trunk line 30 to a main vapor header 32. The vapor header can be adapted for shore connection to transmit the vapors for use in (1) recovering the refrigeration and/or (2) for use as a fuel, and/or (3) for use as a raw material in the petrochemical industry. It can be connected to a re-liquefaction unit on shore or on ship for reconversion of the vapor to the liquefied state to enable return of the liquefied gas to the tank for storage, or it can connect with a vent a safe distance from the unit for release of the vapors to the atmosphere.

The trunk line 30 is fitted with a gate valve 34 to regulate the flow of vapors therethrough. The line 30 is also provided with a calibrated orifice 36 for measuring the rate of flow of vapor through the line. The calibrated orifice is connected by tubing 38 to a flow transmitter 40 which, in turn, is connected to a flow recorder 42 where a record is made of the rate of flow of vapor through the trunk line 30. Variations in flow can be charted for day to day comparisons and for week to week comparisons, or for comparisons between other periods of time whereby characteristics of the insulation and tank can be extrapolated to signal a continuing trend in the increase in rate of vaporization which can be interpreted to mean a gradual deterioration of the insulation, other factors having been taken into consideration. Such signals will make themselves known sufficiently far in advance of actual breakdown as to allow sufficient time to effect replacement or repair at a time when better materials and facilities are available thereby to minimize the cost and expense of operation and thereby to avoid unnecessary and prolonged tie-up of the ship. Most important is the ability to avoid the development of emergency conditions which cannot properly be handled at sea.

The trunk line 30 and the vapor header 32 are adapted to accept only the normal flow of vapors generated because of heat loss through the walls of the shell in operation. Sudden changes in heat loss, occasioned by circumstances other than gradual deterioration of insulation are taken care of by a relief system which embodies a header 44 dimensioned to take care of large volumes of vapors which might suddenly be released. The release header 44 is connected to suitable openings 46 through a number of trunk lines 48 each of which is provided with its own pressure control valve 50 for controlling the opening and closing of the valve. The valves are adapted to be open when the vapor pressure within the tank exceeds a predetermined maximum sufficiently below the minimum for safe operation of the tank, and when the vacuum exceeds a predetermined maximum for safe operation.

It will be understood that other means for recording vaporization rate may be employed whereby suitable comparisons can be easily and accurately made over a period of time to determine the characteristics of the tank and its insulation in operation. Other changes in details of construction, arrangement, and operation may be made without departing from the spirit of the invention, especially as defined in the following claims.

I claim:

1. In an insulated tank of large capacity for the storage of large volumes of low boiling liquefied gas at about atmospheric pressure, an enclosed inner shell of a fluid and vapor-impervious material for housing the liquefied gas, a thick layer of thermal insulating material surrounding the shell to minimize heat loss into the liquid, an inlet in the shell for the transmission of the liquefied gas into and out of the shell, a vapor outlet in the upper portion of the shell in communication with the vapor space above the liquid level for the removal of vapors released by the liquefied gas due to natural heat loss through the insulated shell, a means in communication with the vapor outlet for determining the rate of flow of the vapors from the shell, means for recording the rate of flow for comparison between periods of time to determine increases in the rate of vapor generation to indicate unnatural increases in the heat loss due to deterioration of the insulation, said means for recording the rate of flow including a passage in communication with the vapor outlet, a calibrated orifice in the passage, and a flow meter operatively connected with the said orifice to determine the flow rate.

2. In an insulated tank of large capacity for the storage of large volumes of low boiling liquefied gas at about atmospheric pressure, an enclosed inner shell of a fluid and vapor-impervious material for housing the liquefied gas, a thick layer of thermal insulating material surrounding the shell to minimize heat loss into the liquid, an inlet in the shell for the transmission of the liquefied gas into and out of the shell, a vapor outlet in the upper portion of the shell in communication with the vapor space above the liquid level for the removal of vapors released by the liquefied gas due to natural heat loss through the insulated shell, a means in communication with the vapor outlet for determining the rate of flow of the vapors from the shell, means for recording the rate of flow for comparison between periods of time to determine increases in the rate of vapor generation to indicate unnatural increases in the heat loss due to deterioration of the insulation, another vapor relief outlet in the upper portion of the container, and pressure regulator valves normally closing said relief outlet but which are rendered ineffective to open the relief in response to pressures beyond a predetermined maximum and vacuum beyond a predetermined maximum in the shell.

References Cited in the file of this patent

UNITED STATES PATENTS

| | | |
|---|---|---|
| 2,085,224 | Krueger | June 29, 1937 |
| 2,356,410 | Krugler | Aug. 22, 1944 |
| 2,550,886 | Thompson | May 1, 1951 |